United States Patent [19]

Lobello

[11] 4,278,006
[45] Jul. 14, 1981

[54] EXPANSION SHELL ASSEMBLY

[75] Inventor: John Lobello, Syracuse, N.Y.

[73] Assignee: The Eastern Company, Naugatuck, Conn.

[21] Appl. No.: 95,577

[22] Filed: Nov. 19, 1979

Related U.S. Application Data

[63] Continuation of Ser. No. 903,210, May 5, 1978, abandoned.

[51] Int. Cl.³ .................... F16B 13/06; F16B 13/10
[52] U.S. Cl. ..................................... 411/47; 405/259; 411/53; 411/55; 411/57; 411/72
[58] Field of Search .............. 85/75, 76, 79, 86, 87, 85/88, 71, 63; 405/259, 260, 261

[56] References Cited

U.S. PATENT DOCUMENTS

| 1,790,841 | 2/1931 | Rosen | 85/75 X |
| 2,647,431 | 8/1953 | Lewis | 85/75 |
| 3,221,590 | 12/1965 | Dickow | 85/76 |
| 3,315,557 | 4/1967 | Dickow | 85/75 |
| 3,726,181 | 4/1973 | Dickow et al. | 85/75 |
| 3,999,459 | 12/1976 | Draa | 85/76 |

Primary Examiner—Dennis L. Taylor
Attorney, Agent, or Firm—Charles S. McGuire

[57] ABSTRACT

An expansion anchor for a mine roof support bolt having a one-piece shell, a tapered nut and a strap for maintaining the shell and nut in assembled relation. The shell includes a circular collar having four fingers extending therefrom in a generally cylindrical configuration with an open slot between each pair of adjacent fingers. A pair of solid elements formed integrally with the rest of the shell extend between pair of adjacent fingers to bridge the slots on opposite sides of the shell. The strap extends over the top of the nut, through the slots and has bent-over end portions which are engaged under the solid elements bridging the slots.

1 Claim, 3 Drawing Figures

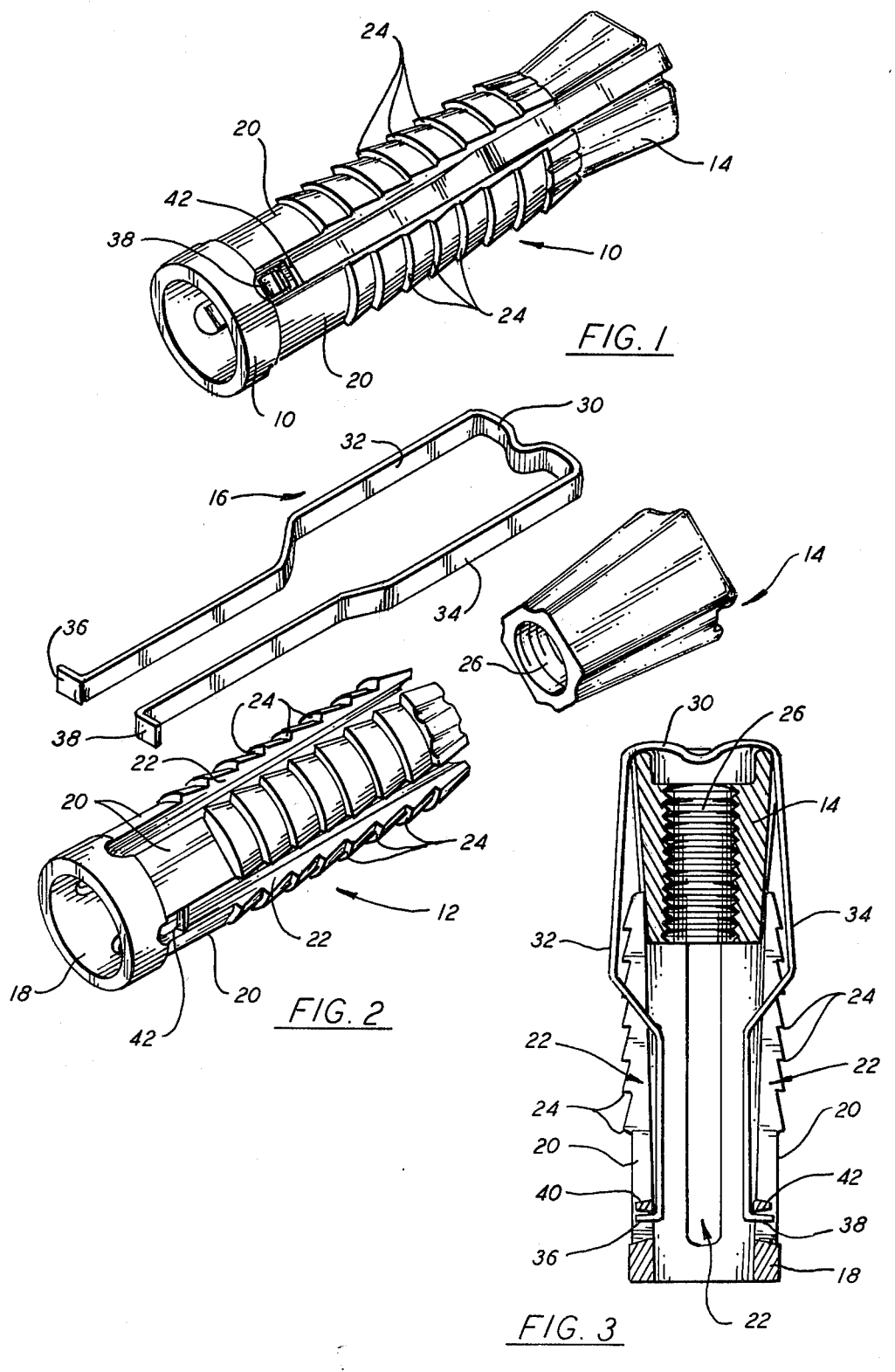

EXPANSION SHELL ASSEMBLY

REFERENCE TO RELATED APPLICATION

This is a continuation of U.S. application Ser. No. 903,210, filed May 5, 1978, now abandoned.

BACKGROUND OF THE INVENTION

The present invention relates to mine roof support means and, more particularly, to expansion type anchors for securing roof bolts in drill holes.

It is a common practice to provide bail means for maintaining the expandable shell and tapered nut of a bolt anchor in assembled relation. For example, in U.S. Pat. No. 3,315,557 of Frederick P. Dickow the bail has its ends hooked through openings in the ends of two opposite expansion fingers of the shell. In U.S. Pat. No. 3,726,181 of Dickow and Lambert, the bail or retaining strap extends over the tapered nut and completely through the shell on both sides, its end portions being bent over to engage under the circular collar of the expansion shell. While such bail arrangements have in general been effective for the intended purpose, they involve structural modifications of the shell which could result in defects in the castings since metal is removed from certain portions of the shell to accommodate the bail or strap.

Accordingly, it is a principal object of the present invention to provide an expansion anchor having bail means securing a tapered nut to an expansion shell without removing metal from any parts of the shell to accommodate the bail or to provide means for securing it to the shell.

In a more general sense, the object of the invention is to provide a novel and improved mine roof bolt expansion anchor of the type having a one-piece, malleable expansion shell held in assembled relation with a tapered nut by means of a bail passing over the nut and secured at its opposite ends to the shell.

Other objects will in part be obvious and will in part appear hereinafter.

SUMMARY OF THE INVENTION

In accordance with the foregoing objects, the invention contemplates an expansion anchor having a one-piece, malleable iron shell with a circular collar at one end having four expansion fingers extending therefrom. The fingers are separated by open slots, two of which are bridged by metal extending between adjacent fingers on opposite sides of the shell relatively near the collar. The tapered nut or wedge is placed with its small end extending into the open end of the shell defined by the free ends of the fingers. A generally U-shaped bail in the form of a flat metal strap has a medial portion passing over the nut and leg portions passing along the slots between adjacent fingers on opposite sides of the shell.

The terminal end portions of each leg of the strap are bent outwardly at approximately 90° angles. The length of the leg portions is such that the bent-out end portions are engaged under the metal portions bridging the slots when the medial portion of the strap is engaged with the nut, holding it in firmly assembled relation with the shell.

BRIEF DESCRIPTION OF THE DRAWING

FIG. 1 is a perspective view of an expansion shell embodying the present invention shown with the elements in assembled condition, ready for use;

FIG. 2 is a perspective view of the shell of FIG. 1 showing each element separately, i.e., before assembly; and FIG. 3 is an elevational view of the shell in half section.

DETAILED DESCRIPTION

Referring now to the drawing, an expansion anchor assembly, denoted generally in FIG. 1 by reference numeral 10, is comprised of expansion shell 12, tapered nut 14 and bail or strap 16. Shell 12 is formed of malleable iron in a single, monolithic piece by conventional casting techniques, and includes circular collar 18 at one end having four expansion fingers 20 extending integrally therefrom. Each of fingers 20 is separated from the adjacent fingers by open slots 22 which extend from collar 20 to the free ends of the fingers.

The external surfaces of fingers 20 are each formed with a plurality of teeth 24 having crests extending transversely across the fingers. Teeth 24 are provided for the purpose of gripping the wall of a blind drill hole as fingers 20 are expanded outwardly from their free ends by axial movement of tapered nut 14 toward collar 18. Such movement is provided by threaded advancement of a standard mine roof bolt (not shown) into threaded bore 26 of nut 14 as shell 12 and nut 14 are restrained against rotation by frictional contact with the interior surface of the drill hole, all in accordance with conventional practice.

Bail 16 is of generally U-shaped configuration, having medial portion 30 and identical leg portions 32 and 34 extending therefrom to terminal end portions 36 and 38 which are bent outwardly at approximately 90 degrees with respect to the associated leg portion. Shell 12 is formed to include integral solid portions 40 and 42 extending between adjacent pairs of fingers 20, thereby bridging the associated slots 22, on opposite sides of shell 12.

The anchor assembly in its completed form, ready for use, is shown in FIGS. 1 and 3 wherein the three elements are held in firmly assembled relation. Nut 14 is placed coaxially with shell 12, with the small end of the nut extending into the space surrounded by the free ends of fingers 20. Bail 16 is then placed with medial portion 30 in engagement with the large end of nut 14 and leg portions 32 and 34 extending generally along the two slots 22 which are bridged by portions 40 and 42 of shell 12. Leg portions 32 and 34 are flexed inwardly as required to allow end portions 36 and 38 to pass inside portions 40 and 42. Bail 16 is formed so that the natural resiliency thereof provides an outward bias, maintaining end portions 36 and 38 engaged under portions 40 and 42, as best seen in FIG. 3. The relative dimensions and configuration of the elements described in such that when end portions 36 and 38 are engaged in the manner shown, nut 14 is maintained by medial portion 30 of bail 16 in assembled relation with shell 12. By placing portions 40 and 42 near the end of slots 22 at collar 18, the portions have little or no effect on uniform radial expansion of fingers 20.

Thus, the anchor assembly of the present invention provides an effective bail means for maintaining the expansion shell and tapered nut in assembled relation without structural modification requiring removal of metal from the shell. Instead, small amounts of metal are added to provide engagement means for the bail. There is no great requirement for structural rigidity or integrity of these portions, as there is for other portions of the shell which are structurally altered by prior art bail attachment means.

What is claimed is:

1. A mine bolt expansion anchor assembly comprising, in combination:
   (a) a one-piece, malleable iron, expansion shell having,
      (i) an annular collar at one end with inner and outer surfaces substantially concentric about a central axis and a flat end surface forming the lower end of said shell;
      (ii) four identical expansion fingers extending integrally from said collar on the side opposite said end surface symmetrically about said central axis to a free end of each at the upper end of said shell;
      (iii) each of said fingers being laterally spaced from adjacent fingers to provide four open slots at 90° intervals about said shell extending from said free ends to said collar;
      (iv) each of said fingers including a toothed outer surface portion extending from said free end for a predetermined part of the total length thereof and a shank portion extending between said toothed surface portion and said collar;
      (v) a pair of bridge members extending entirely across two of said slots at 180° to one another adjacent said collar, forming an integral bond between said shank portions of adjacent fingers on each side of said two slots; and
      (vi) the surfaces of said bridge members facing inwardly toward said central axis being substantially coplanar with the adjacent surfaces of said shank portions;
   (b) a tapered nut having a threaded bore for receiving a mine bolt and placed in engagement with said free ends of said fingers with the small end of said nut oriented toward said shell collar whereby, as said nut is drawn along said central axis into said upper end of said shell by rotation of the bolt as said shell is restrained against rotation, said toothed portions of said fingers are expanded uniformly outwardly from said central axis; and (c) a bail member of generally U-shaped configuration having a medial portion engaging the large end of said tapered nut and leg portions extending from said medial portion through said two slots and having end portions bent to extend into said slots between said collar and said bridge members, thereby retaining said bail member in engagement with said shell, said bridge members being located adjacent said collar at the lower ends of said slots and spaced a sufficient distance therefrom to accommodate said bail member end portions, the length of said leg portions being less than the combined length of said tapered nut and the distance from said bridge members to said free ends of said fingers, whereby said bail serves to retain said nut within the space enclosed by the free ends of said fingers.

* * * * *